US011757892B2

(12) United States Patent
Balasubramanian et al.

(10) Patent No.: US 11,757,892 B2
(45) Date of Patent: Sep. 12, 2023

(54) GENERATED STORY BASED AUTHENTICATION UTILIZING EVENT DATA

(71) Applicant: INTERNATIONAL BUSINESS MACHINES CORPORATION, Armonk, NY (US)

(72) Inventors: Swaminathan Balasubramanian, Troy, MI (US); Peeyush Jaiswal, Boca Raton, FL (US); Cheranellore Vasudevan, Bastrop, TX (US); Priyansh Jaiswal, Boca Raton, FL (US); Sibasis Das, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 17/087,977

(22) Filed: Nov. 3, 2020

(65) Prior Publication Data
US 2022/0141229 A1    May 5, 2022

(51) Int. Cl.
H04L 29/06 (2006.01)
H04L 9/40 (2022.01)

(52) U.S. Cl.
CPC ............ *H04L 63/102* (2013.01); *H04L 63/08* (2013.01)

(58) Field of Classification Search
CPC .............................. H04L 63/102; H04L 63/08
See application file for complete search history.

(56) References Cited

U.S. PATENT DOCUMENTS

| 9,912,657 | B2 |   | 3/2018  | Dasgupta  |             |
|-----------|----|---|---------|-----------|-------------|
| 10,025,450| B1 | * | 7/2018  | Lider     | H04N 21/2743|
| 10,142,841| B2 |   | 11/2018 | Arana     |             |
| 10,375,119| B2 |   | 8/2019  | Aronowitz |             |
| 10,462,126| B2 |   | 10/2019 | Kurian    |             |
| 11,120,157| B2 | * | 9/2021  | Buehler   | H04L 67/53  |
| 11,228,578| B2 | * | 1/2022  | Vasudevan | H04L 63/105 |
| 11,422,996| B1 | * | 8/2022  | Muhlstein | G06N 3/045  |

(Continued)

FOREIGN PATENT DOCUMENTS

WO    2014194439 A    12/2014

OTHER PUBLICATIONS

Aman et al., "4-D Password: Strengthening the Authentication Scene", International Journal of Scientific & Engineerng Research, vol. 3, Issue 10, Oct. 2012, http://www .ijser.org, pp. 1-6.

(Continued)

*Primary Examiner* — Tongoc Tran
(74) *Attorney, Agent, or Firm* — Tihon Poltavets

(57) ABSTRACT

A method for a story fill authentication process includes, responsive to receiving a first authentication request to authenticate a user, displaying a first generated story with one or more obfuscated portions, where the first generated story is based on event data associated with a first previously captured event and additional data utilized to enrich the event data for the first previously captured event. The method also includes, responsive to determining text provided for the one or more obfuscated portions of the first generated story at least meets a comparison threshold level to a first complete generated story based on a semantic comparison, granting the user access to a resource associated with the first authentication request.

20 Claims, 5 Drawing Sheets

(56) References Cited

U.S. PATENT DOCUMENTS

| | | | | |
|---|---|---|---|---|
| 11,480,687 | B1* | 10/2022 | Salkini | H04B 7/195 |
| 2013/0333003 | A1* | 12/2013 | Roy | G06F 21/40 |
| | | | | 726/5 |
| 2015/0326538 | A1* | 11/2015 | Keane | G06F 16/951 |
| | | | | 713/168 |
| 2016/0335679 | A1* | 11/2016 | Kshirsagar | H04L 63/102 |
| 2018/0026972 | A1 | 1/2018 | Nordstrom | |
| 2018/0212975 | A1* | 7/2018 | Bandi | H04L 63/0428 |
| 2019/0019011 | A1* | 1/2019 | Ross | G06F 18/22 |
| 2020/0045055 | A1 | 2/2020 | Diacetis | |
| 2021/0099458 | A1* | 4/2021 | Su | H04L 63/102 |
| 2021/0216649 | A1* | 7/2021 | Sartor | H04L 63/0823 |

OTHER PUBLICATIONS

Greene, "How AI Will Change Storytelling and Become the Next Great Art Form", https://thenextweb.com/artificial-intelligence/2019/01/25/how-ai-will-ch . . . , Jan. 25, 2019 in Artificial Intelligence, pp. 1-7.

https://venturebeat.com/2017/05/01/can-ai-detect-fake-news/, "Can AI Detect Fake News?", printed Jul. 16, 2020, pp. 1-2.

https://www.interactions.com/blog/compliance-and-security/benefits-voi . . . , "Advantages of Voice Biometrics Solution", Nov. 17, 2016, pp. 1-6.

https://www.wired.com/story/how-to-teach-artificial-intelligence-commo . . . , "How to Teach Artificial Intelligence Some Common Sense", Jan. 13, 2018, pp. 1-12.

Jain et al., "New Directions in Social Authentication", USEC '15, Feb. 8, 2015, San Diego, CA, pp. 1-6.

Martin et al., "Event Representations for Automated Story Generation with Deep Neural Nets", SIGKDD 2017, Halifax, Nova Scotia, Canada, pp. 1-8.

Pending U.S. Appl. No. 16/414,987, filed May 17, 2019, entitled, "Multi-Factor Authenication Utilizing Event Data", pp. 1-44.

Pending U.S. Appl. No. 16/415,000, filed May 17, 2019, entitled, "Event Data Fencing Based on Vulnerability Detection", pp. 1-48.

Rogers, "Why I Hacked Apple's TouchID, and Still Think It is Awesome", https://blog.lookout.com/why-i-hacked-apples-touchid-and-still-t . . . , Sep. 23, 2013, pp. 1-7.

Shapiro, "Understanding Events with Artificial Intelligence", https://towardsdatascience.com/understanding-events-with-artificial-intel . . . , Oct. 9, 2017, pp. 1-9.

* cited by examiner

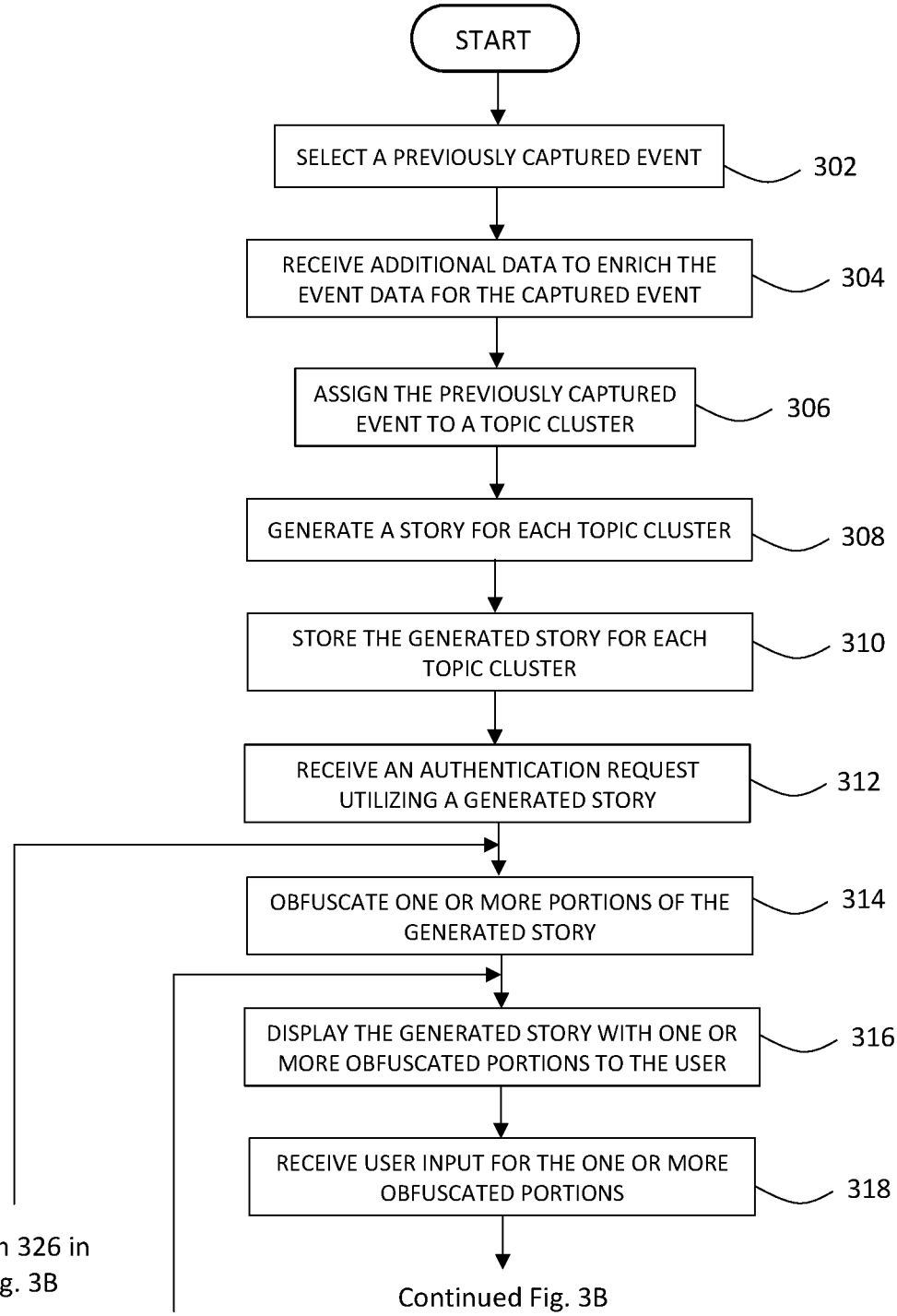

GENERATED STORY BASED AUTHENTICATION UTILIZING EVENT DATA

BACKGROUND

This disclosure relates generally to authentication systems, and in particular to generated story authentication systems utilizing event data.

Typical user authentication methods for accessing an online account or service include a user providing a username and password combination verifiable by a provider of the online account or service. Certain providers of online accounts and service require an additional verification step to access sensitive information (e.g., account and routing numbers) or when the provider's system detects a new device attempting to access an account. The additional verification step can include answering a previously selected question by the user, where an answer to the previously selected question was established months or years prior. However, if the security of the provider becomes compromised by a malicious entity, both the username and password combination, and the answer to the previously selected question become compromised.

SUMMARY

Embodiments in accordance with the present invention disclose a method, computer program product and computer system for a story fill authentication process, the method, computer program product and computer system can responsive to receiving a first authentication request to authenticate a user, a story is created from multiple events gathered from social media and other user profile info gathered. display a first generated story with one or more obfuscated portions, wherein the first generated story is based on event data associated with a first previously captured event and additional data utilized to enrich the event data for the first previously captured event. The method, computer program product and computer system can responsive to determining text provided for the one or more obfuscated portions of the first generated story at least meets a comparison threshold level to a first complete generated story based on a semantic comparison, grant the user access to a resource associated with the first authentication request.

BRIEF DESCRIPTION OF THE SEVERAL VIEWS OF THE DRAWINGS

FIG. 3A is a flowchart depicting operational steps of a story verification program for a story fill authentication, in accordance with an embodiment of the present invention.

DETAILED DESCRIPTION

Figure 1:
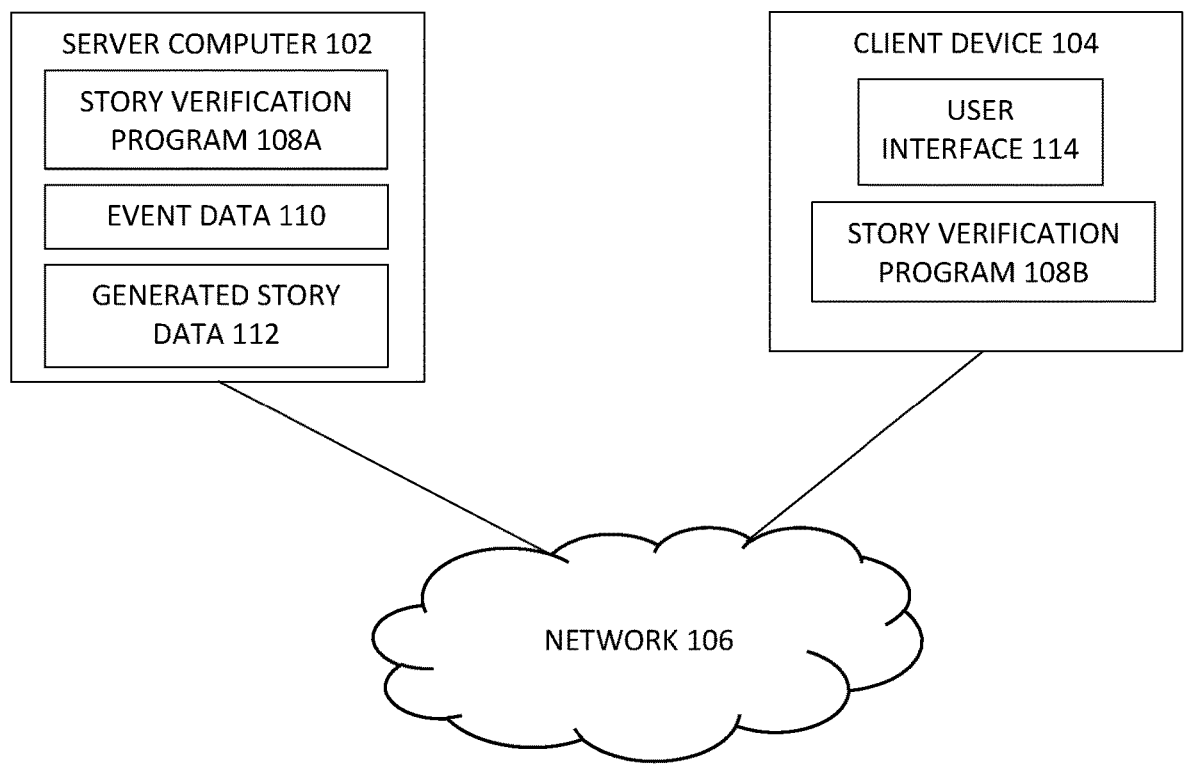
FIG. 1 is a functional block diagram illustrating a distributed data processing environment, in accordance with an embodiment of the present invention.

Embodiments of the present invention provide a user authentication process utilizing a generated story with one or more excluded portions for entry by the user for authentication. During a pre-configuration step, the user authorizes access to event data from one or more sources (e.g., mapping service, social media service), where each of the one or more sources are associated with the user through a user specific account. Embodiments of the present invention selects a previously captured event from a collection of events available from the one or more sources, where the previously captured event is associated with the user through the user specific account. Utilizing additional sources (e.g., publicly available content, private accounts) different from a source associated with the previously captured event, additional data is collected to enrich (i.e., provide additional detail) event data associated with the previously captured event. Subsequent to the enrichment of the event data associated with the previously captured event, embodiments of the present invention apply techniques for text data set clustering (e.g., K-means) to create topic clusters for the enriched events and given the temporal nature of most events, the topic can be constrained to predefined time windows. Sequencing of events for each topic cluster places the associated events in chronological order.

Embodiments of the present invention generates a story based on the sequencing events in chronological order for utilizing in an authentication process of the user. Subsequent to the generated story being selected for utilization in the authentication process of the user, portions (i.e., one or more words) of the generated story are excluded (i.e., removed) and the generated story with the excluded portions are displayed to the user. The exclude portions of the generated story can be based on a unique and memorable event detail (e.g., occurrence of a heavy thunderstorm, a received free service, a surprise guest at a technology conference), an event detail specifically related to the user (e.g., drove vehicle A to event B and purchased gas at fuel station C), and a subevent detail that occurred during the event (e.g., a detour while navigating between an origin location and a destination location). The user can also set preferences on what types of details are excluded from the generated story on each device utilized by the user.

Embodiments of the present invention receives user inputted text for the excluded portions of the generated story and performs a semantic comparison of a complete generated story to the generated story and the excluded portions with the user inputted text utilizing text analytic techniques for approximate matching. If the user inputted text meets or exceeds a threshold level during the approximate matching, access is granted to the user to a resource (e.g., application, account). If the user inputted text does not meet the threshold level, another generated story with excluded portions is displayed to the user if an attempt limit was not exceeded or access is denied to the user to the resource if the attempt limit was exceeded. Subsequent to the user successfully being granted access to the resource, the user has the ability to modify the generated story for future utilization during a story fill authentication process.

FIG. 1 is a functional block diagram illustrating a distributed data processing environment, in accordance with one embodiment of the present invention. The distributed data processing environment includes server computer 102 and client device 104 all interconnected over network 106. For discussion purposes, story verification program 108 can operate on server computer 102 as story verification program 108A and on client device 104 as story verification program 108B.

Server computer 102 may be a desktop computer, a laptop computer, a tablet computer, a specialized computer server, a smartphone, or any computer system capable of executing the various embodiments of story verification program 108A. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes story verification program 108A capable of communicating with story verification program 108B operating on client device 104.

Client device 104 may be a cellphone, smartphone, smartwatch, laptop, tablet computer, or any other electronic device capable of communicating via network 106. Client device 104 is associated with a single user, where the single user has access to one or more applications on client device 104. One or more applications operating on client device 104 (not illustrated in FIG. 1) represents any program capable of generating event data 110 stored on server computer 102 by story verification program 108 while operating on client device 104. In this embodiment, client device 104 includes user interface 114 for interacting with the one or more applications on client device 104 and story verification program 108B.

Event data 110 represents an occurrence or action registerable and storable by one or more applications operating on client device 104, where event data 110 is also identifiable by the single user of client device 104. Examples of the one or more applications include but are not limited to banking services, navigation services, shopping service, media streaming services, smart home management program, social media services, and supply chain management programs. Examples of event data 110 includes but is not limited to a recent credit card statement payment via a banking service, a navigated location via a navigation service, a shopping purchase via a shopping service, a home temperature adjustment via a smart home management program, a recently tagged location via a social media service, and a recent sales figure via a supply chain management program.

Story verification program 108B operating on client device 104 collects event data 110 from the one or more applications on client device 104 for storage on server computer 102. In this embodiment, story verification program 108A performs the operating steps for managing configuration and collection of event data 110 and a story fill authentication process. For managing configuration and collection of event data 110, story verification program 108A receives a device selection (e.g., client device 104) and receives an application selection (i.e., application A) for the device selection. Story verification program 108A receives event data parameters for event data 110 collection for the selected application and stores as a user profile, the device selection, the application selection, and the event data parameters. Story verification program 108A monitors application activities based on the user profile and determines whether an application is selected for which event data 110 is collected. Responsive to determining a select application is activated for which event data 110 is collected, story verification program 108A receives event data 110 for the select application based on the user profile. Story verification program 108A stores event data 110 received for the select application, along with a user identifier and a device identifier (i.e., client device 104).

For the story fill authentication process, story verification program 108A selects a previously captured event from event data 110 and receives additional data to enrich the event data for the captured event. Story verification program 108A assigns the previously captured event to a topic cluster and generates a story for each topic cluster. Story verification program 108A stores the generated story for each topic cluster as generated story data 112 on server computer 102 for subsequent utilization in the story fill authentication process of a user. Responsive to story verification program 108A receiving an authentication request utilizing a generated story, story verification program 108A displays the generated story to the user, where one or more fields from the generated story require an input from the user to complete (i.e., fill) the story.

Responsive to story verification program 108A receiving a correct response from the user for the one or more fields of the generated story, story verification program 108A authenticates the user and grants the user access to the resource (e.g., client device 104, an application on client device 104). Responsive to story verification program 108A receiving an incorrect response from the user and determining an attempt limit has not been exceeded, story verification program 108A allows the user to input another response into the one or more field of the generated story or request another generated story with another one or more fields for authentication. Responsive to the attempt limit being exceeded, story verification program 108A fails to authenticate the user and denies the user access to the resource (e.g., client device 104, an application on client device 104). Subsequently, story verification program 108A sends a notification to the user via one or more known forms of previously established communications channels for a known user of the resource.

In general, network 106 can be any combination of connections and protocols that will support communications between server computer 102 and client device 104. Network 106 can include, for example, a local area network (LAN), a wide area network (WAN), such as the internet, a cellular network, or any combination of the preceding, and can further include wired, wireless, and/or fiber optic connections. In one embodiment, story verification program 108A can be a web service accessible via network 106 to a user of client device 104. In another embodiment, story verification program 108A may be operated directly by a user of server computer 102.

Figure 2:
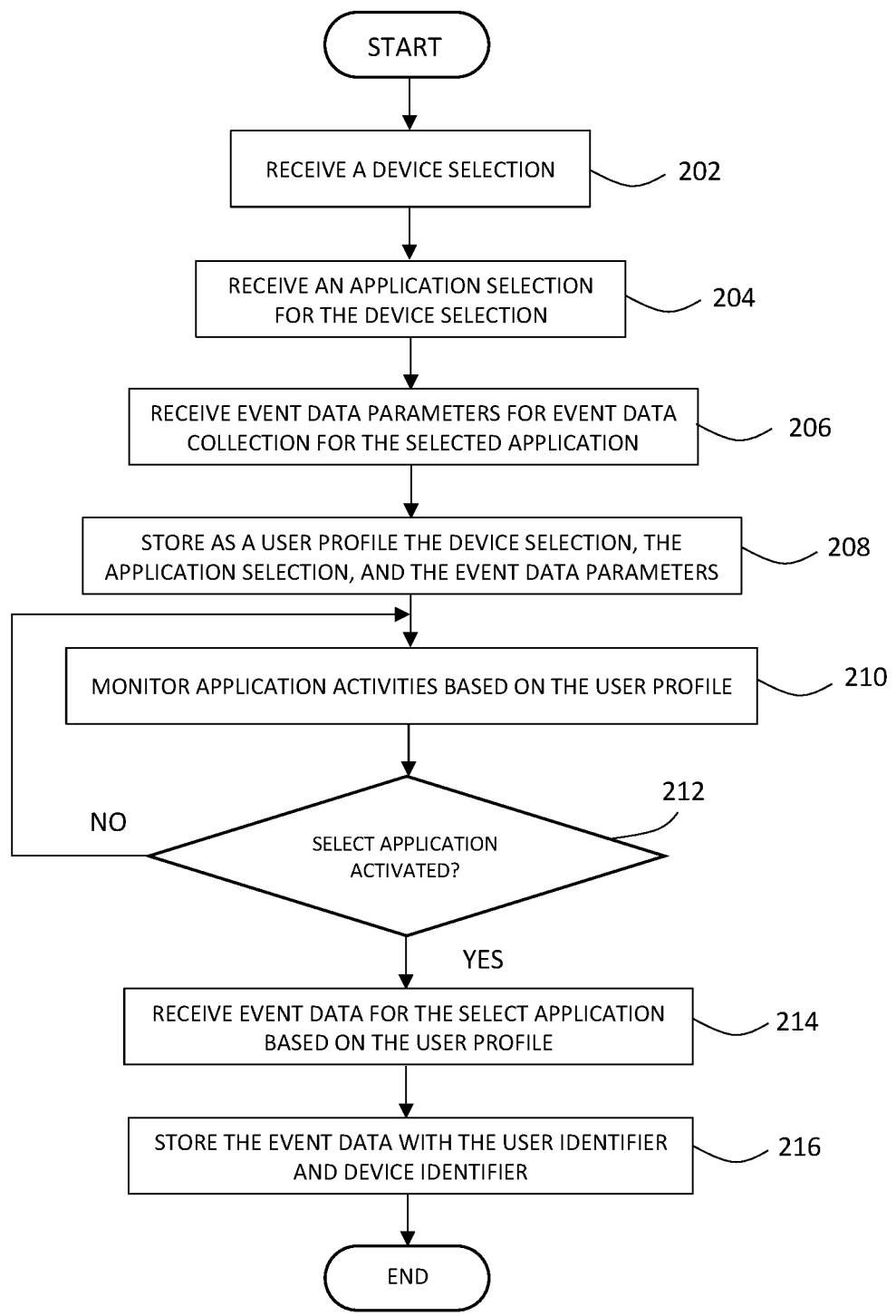
FIG. 2 is a flowchart depicting operational steps of a story verification program for managing configuration and collection of event data, in accordance with an embodiment of the present invention.

FIG. 2 is a flowchart depicting operational steps of a story verification program for managing configuration and collection of event data, in accordance with an embodiment of the present invention.

For discussion purposes, a user is associated with a plurality of electronic devices ranging from a smartphone, a tablet computer, a desktop computer, a smartwatch, or any device capable of connecting via an internet connection (i.e., IoT devices). Being associated with the plurality electronic devices represents the user having access to and/or ownership of each of the plurality of electronic devices, where the user has knowledge of one or more actions (i.e., events) performed on or by each of the plurality of electronic devices. The user can be associated with a specific user profile stored for each of the plurality of devices or if a specific user profile does not exist for a given device out of the plurality of device, a default profile for the given device out of the plurality of device. The user has the ability to identify each of the plurality of devices to be associated. Furthermore, the user has the ability to identify each application on each of the plurality of device from which event data is collected. Which event data is collected from each application is identified by event data parameters, where the user has the ability to define event data parameters for the event data collected from each application. An embodiment of story verification program 108 managing configuration and collection of event data for a device is discussed below.

Story verification program 108 receives (202) a device selection. In this embodiment, story verification program 108 receives a first device selection out of a plurality of devices associated with a user. The first device selection represents the ability for story verification program 108 to utilizes the first device in a story fill authentication process, discussed in further detail with regards to FIGS. 3A and 3B. Story verification program 108 can display a list of the plurality of devices connected on a similar network (i.e., Wi-Fi connection, Bluetooth connection), where a user has the ability to select the first device from the displayed plurality of devices. Alternatively, installing or downloading a client-side version of story verification program 108 on a device allows for story verification program 108 to include the device in the plurality of devices from which the user selects the first device. In this embodiment, story verification program 108 receives a device selection via a user input, where the device selection is for a device on which story verification program 108 operates. In another embodiment, story verification program 108 receives a device selection via a user input, where the device selection is for a device different from a device on which story verification program 108 operates.

Story verification program 108 receives (204) an application selection for the device selection. In this embodiment, story verification program 108 receives a first application selection from a plurality of applications operating on the selected device (i.e., first device). Story verification program 108 can identify the plurality of applications operating on the selected device from which event data is collectable, where story verification program 108 is authorized to collect event data from each of the plurality of applications based on privacy settings on the selected device, each of the plurality of applications, or story verification program 108. Story verification program 108 receives an application selection for the device selection via a user input. As previously discussed with regards to FIG. 1, an application operating on the selected devices can include but is not limited to banking services, navigation services, shopping service, media streaming services, smart home management program, social media services, and supply chain management programs.

Story verification program 108 receives (206) event data parameters for event data collection for the selected application. Story verification program 108 allows for the user to identify event data parameters that defines the event data which story verification program 108 collects for each selected application from each selected device. In this embodiment, story verification program 108 receives event data parameters for event data collection for the selected application via a user input. Examples of event data parameters include but are not limited to location information, accessibility information, communication information, setting information, image information, and purchase information. Location information can represent a location where the selected application is accessed, a location searched utilizing the selected application, a mailing address associated with the selected application, a billing address associated with the selected application, and/or a location favorited utilizing the selected application. Accessibility information can represent a time and date the selected application was last accessed, a time and date authentication credentials for the selected application were last provided, and a username and/or profile name associated with the user that last accessed the selected application. Communication information can represent a time and date of an electronic conversation through the selected application, a username and/or profile name associated with each user partaking in an electronic conversation through the selected application, and/or message content present an electronic conversation through the selected application.

Setting information can represent a preference setting for the selected application, a preference setting for the selected device, and/or a setting associated with one or more functions of the selected application. For example, if a selected application is a mapping service, a preference setting for the selected application can include selecting a route to avoid tolls, a preference setting for the selected device can include selecting audio guidance for navigating, and a setting associated with one or more functions of the selected application can include utilizing a Wi-Fi connection in Vehicle A when available. Image information can represent a screenshot of the selected application and/or a photo taken through the selected application. Purchase information can represent a product purchased through the selected application, a product to be purchased through the selected application, a quantity of an item purchased through the selected application, a shipping address for an item purchased through the selected application, and a service purchased through the selected application.

Story verification program 108 stores (208) as a user profile, the device selection, the application selection, and the event data parameters. Story verification program 108 determines whether a user profile exists for the user providing the device selection, the application selection, and the event data parameters. In the event, story verification program 108 determines the user profile does not exist, story verification program 108 creates a new user profile and stores the as a user profile, the device selection, the application selection, and the event data parameters. In the event, story verification program 108 determines the user profile does exist, story verification program 108 updates the user profile by storing the device selection, the application selection, and the event data parameters.

Story verification program 108 monitors (210) application activities based on the user profile. A client-side story verification program 108 identifies a user utilizing a device on which story verification program 108 operates, where the user is identifiable based on a user login for the device and/or an application on the device. Story verification program 108 monitors which application is activated by the user on the device based on the user profiles associated with the user that logged in on the device and/or an application on the device.

Story verification program 108 determines (212) whether a select application has been activated. In the event, story verification program 108 determines a select application has been activated ("yes" branch, 212), story verification program 108 receives (214) event data for the select application based on the user profile. In the event, story verification program 108 determines a select application has not been activated ("no" branch, 212), story verification program 108 back to (210) and continues to monitor application activities based on the user profile.

Story verification program 108 receives (214) event data for the select application based on the user profile. In this embodiment, story verification program 108 receives event data for the select application based on the user profile, where the user profile includes event data parameters previously received from the user in (206). To address privacy concerns and information accessed on a device, story verification program 108 receives data according to the event data parameters previously established by the user. As a result, story verification program 108 queries the select application only for the event data outlined by the event data parameters. Story verification program 108 can receive the event data in the form of metadata and/or in the form of a video playback of a screen capture of the device on which the event data was generated by the select application.

Story verification program 108 stores (216) the event data with a user identifier and a device identifier. In this embodiment, story verification program 108 stores the event data with a user identifier sourced from the user profile that logged in on the device and/or an application on the device and a device identifier for the device from which the event data was generated by the select application. Story verification program 108 stores the event data with the user identifier and the device identifier for a predetermined amount, where the predetermined amount of time is a default amount of time or a user defined amount of time associated with the user profile and user identifier. For example, story verification program 108 utilizes 7 days as the default amount of time for storing event data for any given user identifier but utilizes 3 days as the user defined amount of time associated the specific user profile and user identifier. Therefore, the user via the user profile can establish the amount of time story verification program 108 stores event data associated with one or more occurrences or actions performed on the select application.

FIG. 3A is a flowchart depicting operational steps of a story verification program for a story fill authentication, in accordance with an embodiment of the present invention.

Story verification program 108 selects a previously captured event (302). Story verification program 108 selects the previously captured event based on previously established user preferences. The previously established user preferences can include privacy settings that prevent certain types of event data (e.g., financial transaction) from being utilized for the story fill authentication and time-based settings that prevent stale event data (e.g., x>seven days) from being utilized for the story fill authentication. In one example, story verification program 108 selects a previously captured event on social media platform BC associated with the user, where the user posted an updated on social media platform BC while attending a technology conference in San Jose, Calif. three days ago. The previously captured event includes five photos posted from the technology conference, a date, a geolocation tag, any text provided by the user, and any other information associated with previously captured event. In another example, story verification program 108 selects a previously captured event for an e-commerce retailer CD account associated with the user for a purchase that occurred two day ago. The previously captured event includes a date of purchase, a number of items purchased, a type of each item purchased, a shipping location for the items purchased, and any other information associated with the previously captured event. In yet another example, story verification program 108 selects a previously captured event on a mapping service, where the user utilized the mapping service to navigate between an origin location (e.g., Philadelphia, Pa.) and a destination location (e.g., New York City) five days ago. The previously captured event includes a date, an origin location, a destination location, a list of one or more roads utilized during the navigation, a list of one or more bridges and/or tunnels utilized during the navigation, one or more locations for stops (e.g. fuel, food) between the origin location and the destination location, and any other information associated with the previously captured event.

Story verification program 108 receives additional data to enrich the event data for the captured data (304). Story verification program 108 receives additional data to enrich the event data for the captured data from one or more sources different than a source from which the captured data was received. In one example, where the captured event was an update posted by the user to the social media platform, story verification program 108 receives additional data to enrich the event data for the captured data from one or more sources (e.g., search engine, event center webpage) other than the social media platform. Story verification program 108 analyzes the captured data and determines that a geo-location for the update posted by the user is at event center A located in San Jose, Calif. and a date for the update posted by the user is Oct. 20, 2020. Story verification program 108 performs an online query for event center A and date Oct. 20, 2020, to identify additional data to enrich the event data for the captured data. In this example, the additional data can include a type of event, a sponsor for the event, a speaker at the event, and any other additional data associated with the previously captured event that the user would be aware of based on the update posted by the user.

In another example, where the captured event was a purchase by an e-commerce retailer account associated with the user, story verification program 108 receives addition data to enrich the event data for the captured data from one or more sources (e.g., credit card service, shipping service) other than the e-commerce retail platform. Story verification program 108 analyzes the captured data and determines the items were purchased utilizing gift card A and the items were shipped utilizing carrier AB. Story verification program 108 queries a credit card service for gift card A and queries carrier AB to obtain the additional data to enrich the event data for the captured data. The additional data received from the credit card service can include a remaining balance on gift card A and the additional data received from carrier AB can include a delivery date, a delivery time, a name associated with a signature release for the shipment, and any other additional data associated with the previously captured evet that the user would be aware of based on the purchase by the e-commerce retailer account.

In yet another example, where the captured event was a trip navigated by the user utilizing a mapping service, story verification program 108 receives additional data to enrich the event data from the captured data from one or more sources (e.g., credit card service, toll collection system) other than the mapping service. Story verification program 108 analyzes the captured data and determines an item was purchased at gas station A and a bridge with a toll was paid for along the route navigated by the user. Story verification program 108 queries a credit card service for the purchase at the gas station and queries the toll collection system for the paid bridge toll to enrich the event data for the captured data. The additional data received from the credit card service can include an item purchased (e.g., gas, food), an amount for the purchase, a name of the gas station, a location of the gas station, and any other additional data associated with the purchase at gas station A. The additional data received from the toll collection system can include a toll amount paid, a name of the bridge where the toll was paid, a state in which the toll was paid, and any other additional data associated with the previously captured event that the user would be aware of based on the trip navigated by the user utilizing the mapping service.

Story verification program 108 assigns the previously captured event to a topic cluster (306). In this embodiment, story verification program 108 utilizes a k-mean algorithm for creating topics clusters from the additional data, where each event data is represented as a vector and utilizes term frequency to identify commonly utilized terms to classify the event data. In another embodiment, story verification program 108 assigns the previously captured event to a topic cluster based on one or more similar qualities. An example of a similar quality can include a time window (e.g., October $11^{th}$ at 8 AM to October $12^{th}$ at 8 AM) for when the previously captured event occurred, where the previously captured event occurred with the time window of the topic cluster. Another example of a similar quality can include a category (e.g., social, work, family) for the captured event, where the previously captured event was associated with a social event and assigned to the topic cluster with social events. In yet another example of a similar quality can include an overall event, where the previously captured event (e.g., update post on a social media platform) belongs to a subevent associated with the overall event (e.g., business trip).

Story verification program 108 generates a story for each topic cluster (308). Story verification program 108 generates the story for each topic cluster based on the event data for the previously captured event and any additional data received to enrich the event data for the previously captured event. For a topic cluster that is associated with a time window, story verification program 108 can generate a story based on a sequence of events that occurred during the time window for the topic cluster. For a topic cluster that is associated with a category (i.e., family), story verification program 108 can generate a story based on events associated with the category. For a topic cluster that is associated with an overall event, story verification program 108 generates a story utilizing one or more subevents that are associated with the overall event.

In one example, where the captured event was an update posted by the user to the social media platform at a technology conference, story verification program 108 generates a story of, "Upon arriving in San Jose, Calif. to attend a technology conference at event center A on Oct. 20, 2020 sponsored by company AB, an update with photos was provided on social media platform BC." Story verification program 108 utilizes the generated story for a user authentication by removing one or more portions of the story corresponding to the event data and the additional data for enriching the event data. In this example, story verification program 108 can request the user perform the following story fill authentication by providing the city (i.e., San Jose), the date (i.e., October $20^{th}$), and the social media platform used (i.e., social media platform BC) for the generated story, where story verification program 108 removes the city, the date, and the social media platform used from the generated story.

In another example, where the captured event was a purchase by an e-commerce retailer account associated with the user, story verification program 108 generates a story of, "On October $15^{th}$, item brand A and item brand B were purchased at e-commerce retailer CD and delivered on October $17^{th}$ by carrier AB." Story verification program 108 utilizes the generated story for a user authentication by removing one or more portions of the story corresponding to the event data and the additional data for enriching the event data. In this example, story verification program 108 can request the user perform the following story fill authentication by providing the brands for the items purchased (i.e., brand A and brand B), a date of delivery (i.e., October $17^{th}$), and a carrier that delivered the purchased items (i.e., carrier AB), where story verification program 108 removes the item brands, the date of delivery, and the carrier from the generated story.

In yet another example, where the captured event was a trip navigated by the user utilizing a mapping service, story verification program 108 generates a story of, "While traveling from Philadelphia, Pa. to New York City, a toll was paid at the George Washington Bridge and a purchase of water was made at a gas station A." Story verification program 108 utilizes the generated story for a user authentication by removing one or more portions of the story corresponding to the event data and the additional data for enriching the event data. In this example, story verification program 108 can request the user perform the following story fill authentication by providing the origin location (i.e., Philadelphia, Pa.), the destination location (i.e., New York City), and a name of the bridge where the toll was paid (i.e., George Washington Bridge), where story verification program 108 removes the origin location, the destination location, and the name of the crossing for the paid toll from the generated story.

Story verification program 108 stores the generated story for each topic cluster (310). In this embodiment, story verification program 108 stores the generated story for each topic cluster and the generated story for each topic cluster with the one or more portions removed, for which the user provides an answer for authentication during the story fill authentication process. Each generated story for each topic cluster that story verification program 108 stores is unique to the user, where only the associated user can provide answers for the one or more portions removed from the generated story. Story verification program 108 has the ability to retain each generated story for a predetermined amount of time (e.g., 5 days) from a time the story was generated or retain each generated story for a predetermined amount of time (e.g., 7 days) from a time of occurrence of the captured event on which the generated story is based. Alternatively, story verification program 108 has the ability to retain each generated story for a predetermined amount of time from a time the story was generated and retain each generated story for a predetermined amount of time from a time of occurrence of the captured event on which the generated story is based, whichever predetermined amount of time is reached first.

Story verification program 108 receives an authentication request utilizing the generated story (312). In this embodiment, story verification program 108 determines a user authentication was prompted in an application (i.e., resource) on a device associated with a user, where the user has to enter credentials (e.g., username and password) for authentication to access content in the application. The application that prompts the user authentication is an application participating the two-factor authentication process. Therefore, story verification program 108 can monitor a plurality of applications participating in the two-factor authentication process to determine when a particular application out of the plurality of applications prompts a user authentication. Alternatively, story verification program 108 can monitor a user interface of the device to determine when the particular application out of the plurality of applications prompts the user for a user authentication.

In one embodiment, story verification program 108 receives the user's credentials for user authentication in the application and prior to granting the user access to the application, story verification program 108 displays the generated story with one or more obfuscated portions to the user (316). In another embodiment, subsequent to determining a user authentication was prompted in the application on a device associated with a user, story verification program 108 prevents a user from entering user credentials for user authentication in the application, story verification program 108 displays the generated story with the one or more obfuscated portions to the user (316). Story verification program 108 prevents the user from entering user credentials for user authentication in the application by greying-out the user authentication prompt, where the user can no longer highlight one or more fields in the application for entry of user credentials.

Story verification program 108 obfuscates one or more portions of the generated story (314). In this embodiment, story verification program 108 obfuscates the one or more portions of the generated story by excluding the one or more portions from the generated story stored in (310). Story verification program 108 displays the generated story with one or more obfuscated portions to the user (316). Story verification program 108 accesses a repository to randomly obtain a previously stored generated story and displays the generates story to the user, where the generated story excludes one or more portions of the story. In a previously discussed example, story verification program 108 generated the story, "Upon arriving in San Jose, Calif. to attend a technology conference at event center A on Oct. 20, 2020 sponsored by company AB, an update with photos was provided on social media platform BC." Story verification program 108 displays the generated story but excludes the portions "San Jose", "October 20$^{th}$", and "social media platform BC", since the excluded portions of the generated story are to be provided by the user for authentication. In another previously discussed example, story verification program 108 generated the story, "On October 15$^{th}$, item brand A and item brand B were purchased at e-commerce retailer CD and delivered on October 17$^{th}$ by carrier AB." Story verification program 108 displays the generated story but excludes the portions "brand A", "brand B", "October 17$^{th}$", and "carrier AB", since the excluded portions of the generated story are to be provided by the user for authentication. In yet another example previously discussed example, story verification program 108 generated the story, While traveling from Philadelphia, Pa. to New York City, a toll was paid at the George Washington Bridge and a purchase of water was made at a gas station A." Story verification program 108 displays the generated story but excludes the portions "Philadelphia, Pa.", "New York City", and "George Washington Bridge", since the excluded portions of the generated story are to be provided by the user for authentication.

Story verification program 108 receives user input for the one or more obfuscated portions (318). In this embodiment, story verification program 108 receives the user input via text entered into a corresponding field for each of the one or more obfuscated portions of the generated story. In another embodiment, story verification program 108 provides a list of multiple text entries (i.e., multiple choice) for each of the one or more obfuscated portions of the generated story, where the user selects a single text entry from the list of multiple text entries via user input for entry into each of the one or more obfuscated portions of the generated story. Story verification program 108 also has the ability to provide one or more hints for assisting the user when providing text for the one or more obfuscated portions of the generated story.

Figure 3B:
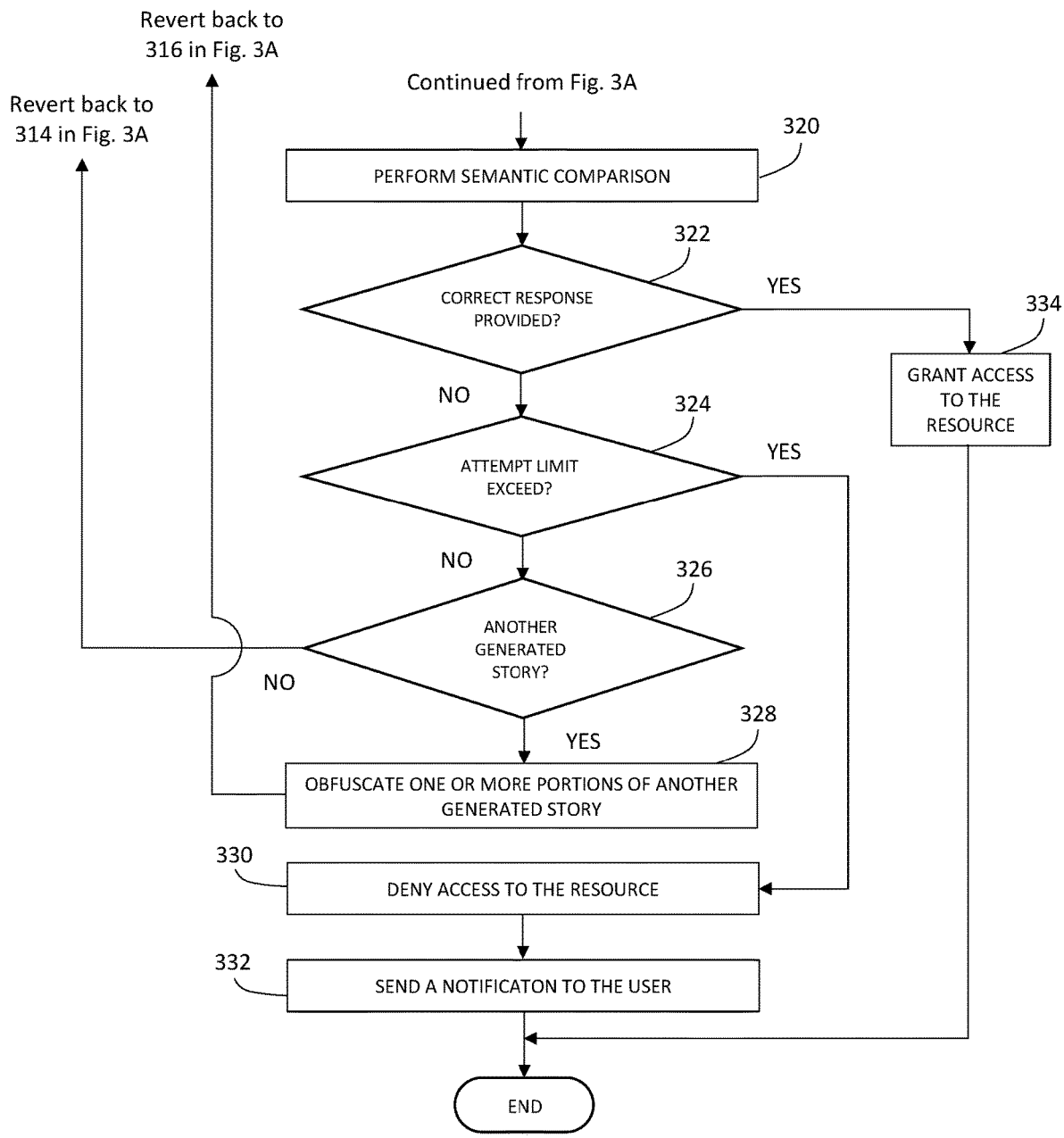
FIG. 3B is a flowchart depicting continued operational steps of a story verification program for the story fill authentication process from FIG. 3A, in accordance with an embodiment of the present invention.

FIG. 3B is a flowchart depicting continued operational steps of a story verification program for the story fill authentication process from FIG. 3A, in accordance with an embodiment of the present invention.

Story verification program 108 performs a semantic comparison (320). In this embodiment, story verification program 108 performs the semantic comparison between the generated story in (308) to the partially generated story with user inputted text into the one or more portions obfuscated from the generated story, previously discussed in (314)-(318) with regards to FIG. 3A. Story verification program 108 utilizes text analytics techniques to match the user inputted text into the one or more portions excluded from the generated story and a threshold level to perform cognitive matching. The threshold level takes into account spelling variations (e.g., American English vs British English), minor misspellings, and acronyms utilized for two or more words. For example, story verification program 108 receives a response for an excluded portion of the generated story that misspells "Philadelphia, Pa." as "Philadelphia, Pa.", but story verification program 108 determines the threshold level was reached despite the minor misspelling. In another example, story verification program 108 receives a response for an excluded portion of the generated story that uses a common acronym "GWB" for "George Washing Bridge", but story verification program 108 determines the threshold level was reached despite the acronym being utilized in place of the full name.

Story verification program 108 determines whether a correct response was provided for the generate story (decision 322). In the event story verification program 108 determines a correct response was not provided for the generated story ("no" branch, decision 316), story verification program 108 determines whether an authentication verification attempt limit was exceeded (decision 324). In the event story verification program 108 determines a correct response was provided for the generated story ("yes" branch, decision 322), story verification program 108 grants the user access to the resource (334).

Story verification program 108 determines whether an authentication verification attempt limit was exceeded (decision 324). In the event story verification program 108 determines an authentication verification attempt limit was not exceed ("no" branch, decision 324), story verification program 108 determines whether to generate another story for user authentication (decision 326). In the event story verification program 108 determines an authentication verification attempt limit was exceed ("yes" branch, decision 324), story verification program 108 denies the user access to the resource (330).

Story verification program 108 determines whether to generate another story for user authentication (decision 326). In the event story verification program 108 determines to generate another story for user authentication ("yes" branch, decision 326), story verification program 108 obfuscates one or more portions of another generated story (328). In the event story verification program 108 determines not to generate another story for user authentication ("no" branch, decision 326), story verification program 108 reverts back to obfuscating the one or more portions of the generates story (314).

Story verification program 108 obfuscates one or more portions of another generated story (322). Story verification program 108 obfuscates the one or more portions of another generated story to the user from a topic cluster that is different than a topic cluster for the generated story with the one or more obfuscated portions previously discussed with regards to (314) in FIG. 3A. Story verification program 108 can also provide the user an option to select a time window (e.g., previous 24 hours, previous 16 hours) from which story verification program 108 can select another generated story and display the other generated story with the one or more obfuscated portions to the user.

Story verification program 108 denies the user access to the resource (330). In this embodiment, story verification program 108 reverts prevents the user from entering user credentials for user authentication in the application by greying-out the user authentication prompt, where the user can no longer highlight one or more fields in the application for entry of user credentials. In another embodiment, where user's credentials for user authentication in the application were received prior to initializing the two-factor authentication process, event story verification program 108 reverts denies access to content in the application that prompted the user authentication.

Story verification program 108 sends a notification to the user (332). In this embodiment, story verification program 108 sends a notification to the user via a channel provided by a third party (e.g., email). The channel provided by the third party is such that the application and/or the device are not the means through which story verification program 108 sends the notification. The notification can include a name of the application and a name of the device which prompted the user authentication, along with the generated story provided to the user which was incorrectly answered during the two-factor authentication process. Story verification program 108 can send the notification to an email account associated with the user or to an email account associated with both the user and the application.

Story verification program 108 grants the user access to the resource (334). In this embodiment, story verification program 108 grants the user access to enter user credentials for user authentication in the application by ceasing to grey-out the user authentication prompt, where the user can highlight one or more fields in the application for entry of user credentials. In another embodiment, where user's credentials for user authentication in the application were received prior to initializing the two-factor authentication process, story verification program 108 grants access to content in the application that prompted the user authentication.

Figure 4:
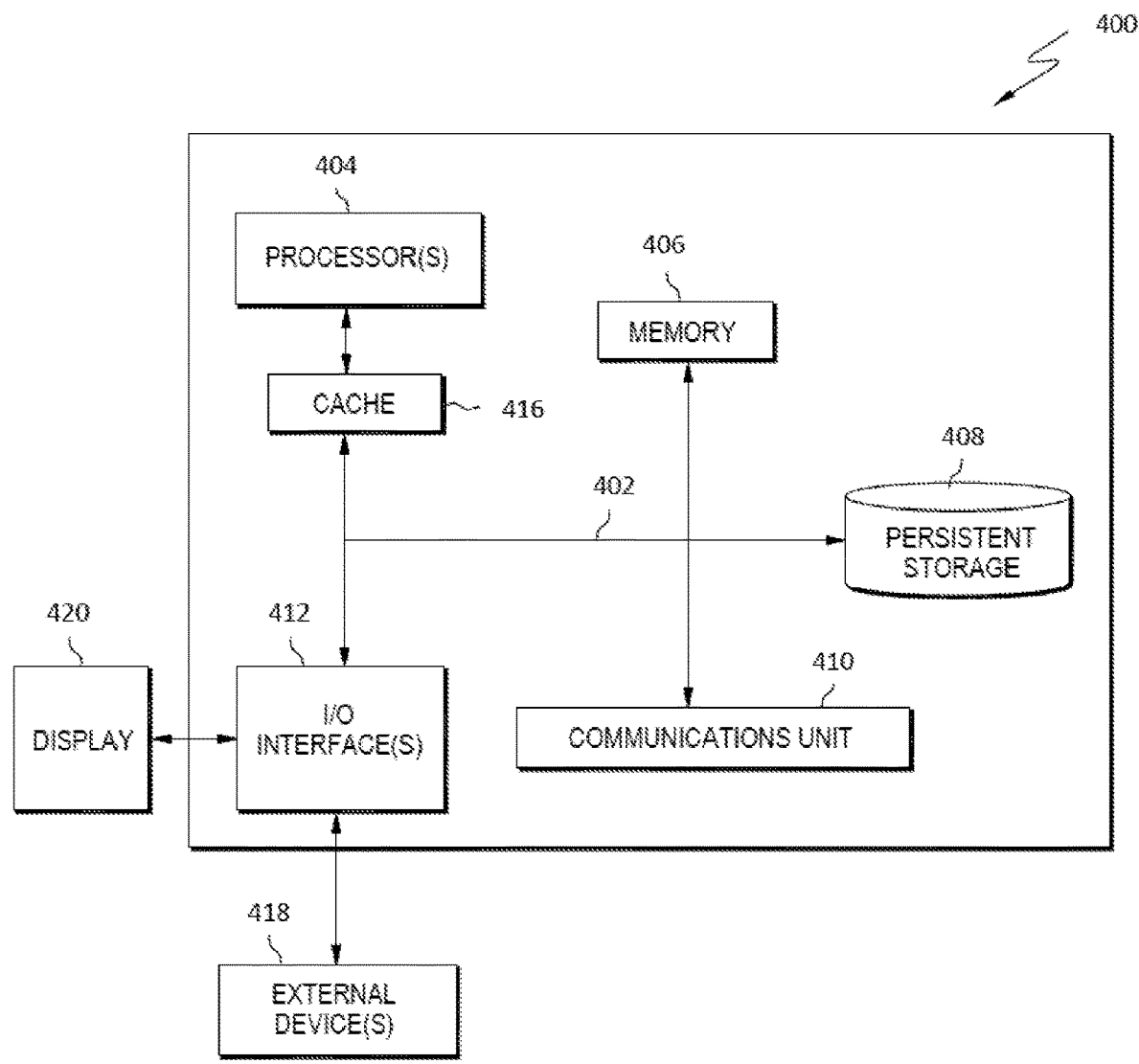
FIG. 4 is a block diagram of components of a computer system, such as the server computer of FIG. 1, in accordance with an embodiment of the present invention.

FIG. 4 depicts computer system 400, where server computer 102 and client device 104 are examples of a system that include story verification program 108A and 108B, respectively. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
responsive to receiving a first authentication request to authenticate a user, obfuscating, by one or more processors, one or more portions within a first generated story associated with the user, wherein text associated with the one or portions is excluded from the first generated story;
displaying, by one or more processors, the first generated story with the one or more obfuscated portions, wherein the first generated story is based on event data associated with a first previously captured event associated with the user and additional data utilized to enrich the event data for the first previously captured event associated with the user; and responsive to determining user provided text for the one or more obfuscated portions of the first generated story at least meets a comparison threshold level to a first complete generated story based on a semantic comparison, granting, by one to more processors, the user access to a resource associated with the first authentication request.

2. The method of claim 1, further comprising:

selecting, by one or more processors, from a plurality of previously captured events, the first previously captured event associated with the user, wherein the first previously captured event occurred on a device associated with the user; and receiving, by one or more processors, the additional data to enrich the event data associated with the first previously captured event from a first source different that a second source for the event data.

3. The method of claim 2, further comprising:

assigning, by one or more processors, the previously captured event to a topic cluster based on the event data associated with the first previously captured event and the additional data utilized to enrich the event data; and generating, by one or more processors, a story for the topic cluster representing the first complete generated story.

4. The method of claim 3, further comprising:

identifying, by one or more processors, one or more portions to obfuscate from the first complete generated story based on one or more of: an event detail for the first generated story, an event detail relating to the user, and a subevent detail that occurred during the event.

5. The method of claim 4, further comprising:

performing, by one or more processors, the semantic comparison between the first complete generated story and the first generated story with the one or more obfuscated portions, where one or more corresponding fields for the one or more obfuscated portions includes text provided by the user via a user input.

6. The method of claim 1, further comprising:

responsive to receiving a second authentication request to authenticate the user, displaying, by one or more processors, a second generated story with one or more obfuscated portions, wherein the second generated story is based on event data associated with a second previously captured event and the additional data utilized to enrich the event data for the second previously captured event;

responsive to determining text provided for the one or more obfuscated portions of the second generated story does not meet a comparison threshold level to a second complete generated story; displaying, by one or more processors, a third generated story with one or more obfuscated portions, wherein the third generated story is based on event data associated with a third previously captured event and the additional data utilized to enrich the event data for the third previously captured event.

7. The method of claim 6, further comprising:

responsive to determining an attempt limit has not been exceed, determining, by one or more processor, whether to display the second generated story with the one or more obfuscated portions or the third generated story with the one or more obfuscated potions.

8. The method of claim 7, further comprising:

responsive to determining text provided for the one or more obfuscated portions of the third generated story at least meets a comparison threshold level to a third complete generated story, granting, by one to more processors, the user access to a resource associated with the second authentication request.

9. A computer program product comprising:

one or more computer readable storage media and program instructions stored on at least one of the one or more storage media, the program instructions comprising:

program instructions to, responsive to receiving a first authentication request to authenticate a user, obfuscate one or more portions within a first generated story associated with the user, wherein text associated with the one or portions is excluded from the first generated story;

program instructions to display the first generated story with the one or more obfuscated portions, wherein the first generated story is based on event data associated with a first previously captured event associated with the user and additional data utilized to enrich the event data for the first previously captured event associated with the user; and program instructions to, responsive to determining user provided text for the one or more obfuscated portions of the first generated story at least meets a comparison threshold level to a first complete generated story based on a semantic comparison, grant the user access to a resource associated with the first authentication request.

10. The computer program product of claim 9, further comprising program instructions, stored on the one or more computer readable storage media, which when executed by a processor, cause the processor to:

select from a plurality of previously captured events, the first previously captured event associated with the user, wherein the first previously captured event occurred on a device associated with the user; and receive the additional data to enrich the event data associated with the first previously captured event from a first source different that a second source for the event data.

11. The computer program product of claim 10, further comprising program instructions, stored on the one or more computer readable storage media, which when executed by a processor, cause the processor to:

assign previously captured event to a topic cluster based on the event data associated with the first previously captured event and the additional data utilized to enrich the event data; and generate a story for the topic cluster representing the first complete generated story.

12. The computer program product of claim 11, further comprising program instructions, stored on the one or more computer readable storage media, which when executed by a processor, cause the processor to:

identify one or more portions to obfuscate from the first complete generated story based on one or more of: an event detail for the first generated story, an event detail relating to the user, and a subevent detail that occurred during the event.

13. The computer program product of claim 12, further comprising program instructions, stored on the one or more computer readable storage media, which when executed by a processor, cause the processor to:

perform the semantic comparison between the first complete generated story and the first generated story with the one or more obfuscated portions, where one or more corresponding fields for the one or more obfuscated portions includes text provided by the user via a user input.

14. The computer program product of claim 9, further comprising program instructions, stored on the one or more computer readable storage media, which when executed by a processor, cause the processor to:
responsive to receiving a second authentication request to authenticate the user, display a second generated story with one or more obfuscated portions, wherein the second generated story is based on event data associated with a second previously captured event and the additional data utilized to enrich the event data for the second previously captured event;
responsive to determining text provided for the one or more obfuscated portions of the second generated story does not meet a comparison threshold level to a second complete generated story; display a third generated story with one or more obfuscated portions, wherein the third generated story is based on event data associated with a third previously captured event and the additional data utilized to enrich the event data for the third previously captured event.

15. The computer program product of claim 14, further comprising program instructions, stored on the one or more computer readable storage media, which when executed by a processor, cause the processor to:
responsive to determining an attempt limit has not been exceed, determine whether to display the second generated story with the one or more obfuscated portions or the third generated story with the one or more obfuscated potions.

16. The computer program product of claim 15, further comprising program instructions, stored on the one or more computer readable storage media, which when executed by a processor, cause the processor to:
responsive to determining text provided for the one or more obfuscated portions of the third generated story at least meets a comparison threshold level to a third complete generated story, grant the user access to a resource associated with the second authentication request.

17. A computer system comprising:
one or more computer processors;
one or more computer readable storage media; and
program instructions stored on the computer readable storage media for execution by at least one of the one or more computer processors, the program instructions comprising:
program instructions to, responsive to receiving a first authentication request to authenticate a user, obfuscate one or more portions within a first generated story associated with the user, wherein text associated with the one or portions is excluded from the first generated story;
program instructions to display the first generated story with the one or more obfuscated portions, wherein the first generated story is based on event data associated with a first previously captured event associated with the user and additional data utilized to enrich the event data for the first previously captured event associated with the user; and
program instructions to, responsive to determining user provided text for the one or more obfuscated portions of the first generated story at least meets a comparison threshold level to a first complete generated story based on a semantic comparison, grant the user access to a resource associated with the first authentication request.

18. The computer system of claim 17, further comprising program instructions, stored on the one or more computer readable storage media, which when executed by a processor, cause the processor to:
select from a plurality of previously captured events, the first previously captured event associated with the user, wherein the first previously captured event occurred on a device associated with the user; and
receive the additional data to enrich the event data associated with the first previously captured event from a first source different that a second source for the event data.

19. The computer system of claim 18, further comprising program instructions, stored on the one or more computer readable storage media, which when executed by a processor, cause the processor to:
assign previously captured event to a topic cluster based on the event data associated with the first previously captured event and the additional data utilized to enrich the event data; and
generate a story for the topic cluster representing the first complete generated story.

20. The computer system of claim 19, further comprising program instructions, stored on the one or more computer readable storage media, which when executed by a processor, cause the processor to:
identify one or more portions to obfuscate from the first complete generated story based on one or more of: an event detail for the first generated story, an event detail relating to the user, and a subevent detail that occurred during the event.

* * * * *